(12) United States Patent
Thompson et al.

(10) Patent No.: US 10,284,235 B2
(45) Date of Patent: May 7, 2019

(54) WIRELESS TRANSCEIVER WITH SWITCH TO REDUCE HARMONIC LEAKAGE

(71) Applicant: SKYWORKS SOLUTIONS, INC., Woburn, MA (US)

(72) Inventors: Philip H. Thompson, Cedar Rapids, IA (US); Steven T. Seiz, Summerfield, NC (US); Roman Zbigniew Arkiszewski, Oak Ridge, NC (US); Matthew Lee Banowetz, Marion, IA (US); Duane A. Green, Hiawatha, IA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

(21) Appl. No.: 15/214,727

(22) Filed: Jul. 20, 2016

(65) Prior Publication Data

US 2017/0026136 A1   Jan. 26, 2017

Related U.S. Application Data

(60) Provisional application No. 62/195,387, filed on Jul. 22, 2015.

(51) Int. Cl.
*H04B 1/00* (2006.01)
*H04B 1/525* (2015.01)

(52) U.S. Cl.
CPC .............. *H04B 1/006* (2013.01); *H04B 1/525* (2013.01)

(58) Field of Classification Search
CPC .......... H04B 15/00; H04B 1/006; H04B 1/40; H04B 1/44; H04B 1/0483; H04B 1/005; H04W 88/06; H04W 72/0446; H04W 52/16; H01Q 5/35; H01Q 5/378; H04M 1/0249
See application file for complete search history.

(56) References Cited

U.S. PATENT DOCUMENTS

| | | | |
|---|---|---|---|
| 2009/0075608 A1* | 3/2009 | Ichitsubo | H04B 1/44 455/127.2 |
| 2012/0044022 A1* | 2/2012 | Walker | H03F 1/0261 330/296 |
| 2013/0044621 A1* | 2/2013 | Jung | H04W 72/082 370/252 |

(Continued)

OTHER PUBLICATIONS

Single-Chip Multiband Transceiver, Sowlati et al, IEEE, 2009.*

*Primary Examiner* — Jianxun Yang
(74) *Attorney, Agent, or Firm* — Chang & Hale LLP

(57) ABSTRACT

Disclosed herein are wireless transceivers with switches to reduce harmonic leakage. In some embodiments, a transmitter system includes a power amplification system including a first power amplifier configured to amplify a signal at a first cellular frequency band and a second power amplifier configured to amplify a signal at a second cellular frequency band. The transmitter includes a switch coupled between an output of the second power amplifier and a ground potential. The transmitter includes a controller configured to, based on a band select signal, control the switch and selectively enable or disable each of the first power amplifier and the second power amplifier. Selective control of the switch can reduce harmonic leakage compared to a system that does not include the disclosed switches and controls.

20 Claims, 8 Drawing Sheets

(56) References Cited

U.S. PATENT DOCUMENTS

2013/0044791 A1* 2/2013 Rimini .................. H04B 1/109
 375/219
2014/0120991 A1* 5/2014 Wong ..................... H01Q 5/35
 455/575.1

* cited by examiner

WIRELESS TRANSCEIVER WITH SWITCH TO REDUCE HARMONIC LEAKAGE

CROSS-REFERENCE TO RELATED APPLICATION(S)

This application claims priority to U.S. Provisional Application No. 62/195,387 filed Jul. 22, 2015, entitled WIRELESS TRANSCEIVER WITH SWITCH TO REDUCE HARMONIC LEAKAGE, the disclosure of which is hereby expressly incorporated by reference herein in its entirety.

BACKGROUND

Field

The present disclosure relates to transceiver systems configured to transmit and receive a plurality of wireless communication frequency bands.

Description of Related Art

In some wireless devices, such as cellular handsets, two or more cellular protocols may be supported to transmit and/or receive data. The respective protocols may be transmitted using dedicated transmit paths and received using dedicated receive paths, each path having suitable amplification and/or filtering components, the paths being coupled to one or more antennas.

SUMMARY

According to a number of implementations, the present disclosure relates to a transmitter system that can include a power amplification system including a first power amplifier configured to amplify a signal at a first cellular frequency band and a second power amplifier configured to amplify a signal at a second cellular frequency band. The transmitter system can include a switch coupled between an output of the second power amplifier and a ground potential. The transmitter can include a controller configured to, based on a band select signal, control the switch and enable or disable the first power amplifier and the second power amplifier.

In some embodiments, the controller is configured to open the switch in response to the band select signal indicating the second cellular frequency band as a transmission band. In some embodiments, the controller is configured to close the switch in response to the band select signal indicating the second cellular frequency band as a reception band, but not a transmission band.

In some embodiments, the controller is configured to control a band select switch of the power amplification system based on the band select signal. In some embodiments, the switch and the band select switch are integrated into a switching module. In some embodiments, the switching module includes a single chip. In some embodiments, the switch is coupled between an output of the band select switch and a ground terminal of the switching module. In some embodiments, the switch is coupled between a shunt input terminal of the switching module and a ground terminal of the switching module.

In some embodiments, a harmonic of the first cellular frequency band lies within the second cellular frequency band. In some embodiments, the first cellular frequency band includes Universal Mobile Telecommunications System (UMTS) Band 17 and the second cellular frequency band includes UMTS Band 4. In some embodiments, the first cellular frequency band includes Universal Mobile Telecommunications System (UMTS) Band 17 and the second cellular frequency band includes Global System for Mobile Communications (GSM) Band 1900.

In a number of implementations, the present disclosure relates to a radio-frequency (RF) module that can include a packaging substrate configured to receive a plurality of components. The module can include a transmitter system implemented on the packaging substrate, the transmitter system including a power amplification system including a first power amplifier configured to amplify a signal at a first cellular frequency band and a second power amplifier configured to amplify a signal at a second cellular frequency band, a switch coupled between an output of the second power amplifier and a ground potential, and a controller configured to, based on a band select signal, control the switch and enable or disable the first power amplifier and the second power amplifier.

In some embodiments, the RF module is a front-end module (FEM). In some embodiments, the controller is configured to close the switch in response to the band select signal indicating the second cellular frequency band as a reception band, but not a transmission band.

In some embodiments, the first power amplifier and the second power amplifier are implemented with separate chips. In some embodiments, the separate chips are coupled to separate die attach ground pads of the RF module.

In some embodiments, a first output terminal of the RF module coupled to an output of the first power amplifier and a second output terminal coupled to an output of the second power amplifier are spatially separated.

In accordance with some implementations, the present disclosure relates to a wireless device can include a transceiver configured to generate a radio-frequency (RF) signal. The wireless device can include a front-end module (FEM) in communication with the transceiver, the FEM including a packaging substrate configured to receive a plurality of components, the FEM further including a transmitter system implemented on the packaging substrate, the transmitter system including a power amplification system including a first power amplifier configured to amplify a signal at a first cellular frequency band and a second power amplifier configured to amplify a signal at a second cellular frequency band, a switch coupled between an output of the second power amplifier and a ground potential, and a controller configured to, based on a band select signal, control the switch and enable or disable the first power amplifier and the second power amplifier. The wireless device can include an antenna in communication with the FEM, the antenna configured to transmit an amplified version of the signal received from the transmitter system.

In some embodiments, the controller is configured to close the switch in response to the band select signal indicating the second cellular frequency band as a reception band, but not a transmission band. In some embodiments, a harmonic of the first cellular frequency band lies within the second cellular frequency band.

For purposes of summarizing the disclosure, certain aspects, advantages and novel features of the inventions have been described herein. It is to be understood that not necessarily all such advantages may be achieved in accordance with any particular embodiment. Thus, the inventions may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Many wireless devices such as cellular handsets are configured to support multiple cellular protocols and/or multiple cellular frequency bands. In order to improve wireless data throughput, some wireless devices employ carrier aggregation in which multiple cellular frequency bands are used at the same time to transmit and/or receive data. In some implementations, a single cellular frequency band is used for transmission and multiple cellular frequency bands are used for reception. As an example, a wireless device may transmit at a first cellular frequency band (e.g., UMTS Band 17) and receive at both the first cellular frequency band and a second cellular frequency band (e.g., UMTS Bands 17 and 4).

In some implementations, the reception at the second cellular frequency band (e.g., UMTS Band 4) can be degraded since the third harmonic of the first cellular frequency band (e.g., UMTS Band 17) lies within the receive frequency range of the second cellular frequency band (e.g., UMTS Band 4). Thus, in some implementations, the wireless device is designed and/or configured to reduce or minimize harmonic distortion in the active transmission signal path and inhibit or prevent leakage of this signal to other paths.

In some embodiments, the power amplifier supporting the first cellular frequency band (e.g., UMTS Band 17) and the power amplifier supporting the second cellular frequency band (e.g., UMTS Band 4) are housed in separate packages with attention paid in the circuit board design and layout to prevent unwanted coupling between the two amplification paths. Such an approach, however, may lead to higher costs and larger overall size.

Disclosed herein are various examples of circuits, devices and methods that can be configured to, among other things, address the foregoing challenges associated with carrier aggregation communication systems. In some implementations as described herein, harmonic leakage reduction switches are implemented within the power amplification system of a wireless device and are controlled (e.g., opened or closed) to reduce harmonic leakage.

Figure 1:
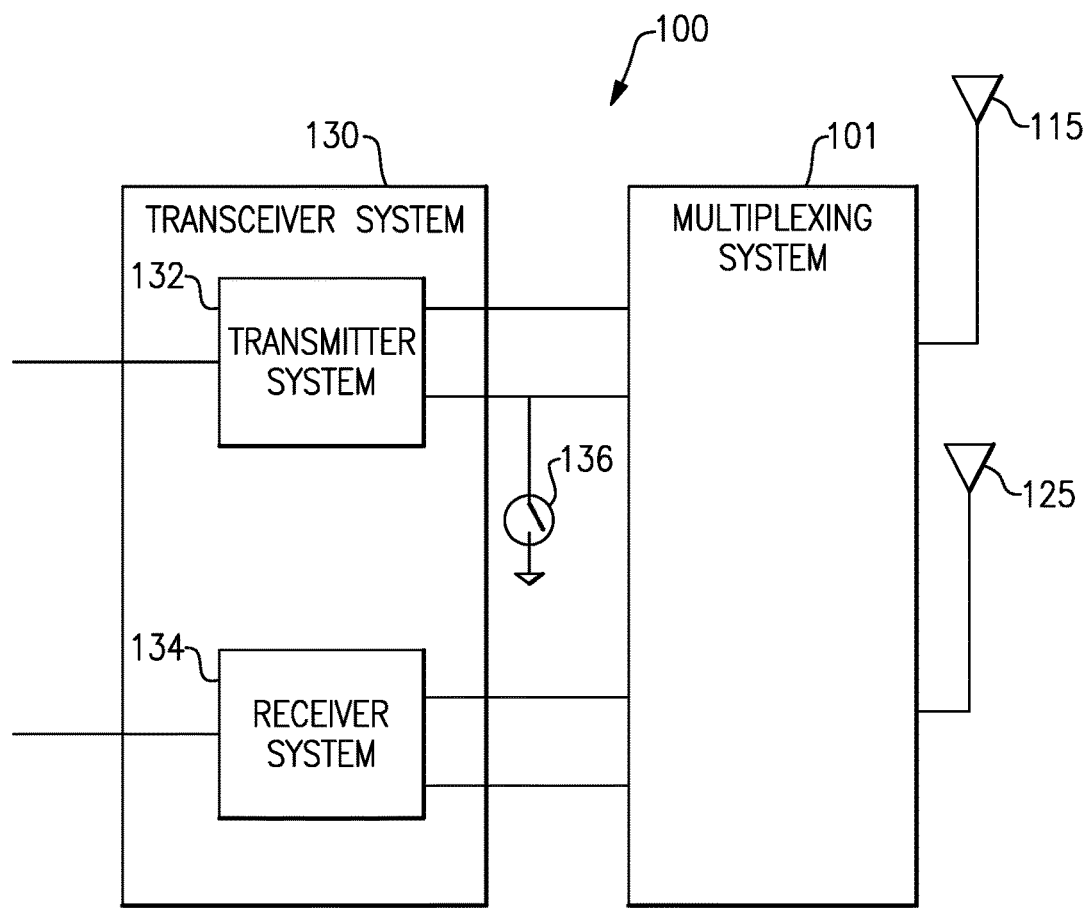
FIG. 1 illustrates an example wireless communication configuration that includes a switch to reduce harmonic leakage.

FIG. 1 schematically shows an example wireless communication configuration 100 that includes a switch 136 to reduce harmonic leakage. The wireless communication configuration 100 further includes a transceiver system 130, a multiplexing system 101, and one or more antennas 115, 125.

The multiplexing system 101 provides signals received from corresponding outputs of the transceiver system 130 to the antennas 115, 125. Similarly, the multiplexing system 101 provides signals received via the antennas 115, 125 to corresponding inputs of the transceiver system 130. To that end, the multiplexing system 101 may include switches, duplexers, and other components.

The transceiver system 130 includes a transmitter system 132 that converts digital data signals into radio-frequency (RF) signals for transmission via the antennas 115, 125. To that end, the transmitter system 132 may include a baseband system, a modulator including a local oscillator, a digital-to-analog converter, a power amplifier, and other components. The transceiver system 130 further includes a receiver system 134 that converts received signals into digital data signals. To that end, the receiver system 134 may include a low-noise amplifier (LNA), a demodulator including a local oscillator, an analog-to-digital converter, a baseband system, and other components.

The transmitter system 132 is configured to transmit a signal (based on a digital data signal received at an input) at one or more of a set of cellular frequency bands via respective outputs. For example, the transmitter system 132 may transmit a signal at a first cellular frequency band via a first output, at a second cellular frequency band via a second output, or both. Similarly, the receiver system 134 is configured to receive a signal at one or more of a set of cellular frequency bands via respective inputs and generate a digital data signal based on the received signal(s). For example, the receiver system 134 may receive a signal at the first cellular frequency band via a first input, at a second cellular frequency band via a second input, or both. Although FIG. 1 shows the transmitter system 132 with two outputs and the receiver system 134 with two inputs, it is to be appreciated that the transmitter system 132 and receiver system 134 may have additional outputs and/or inputs for additional cellular frequency bands.

The cellular frequency bands at which the transmitter system 132 and receiver system 134 operate may be set by a band select signal indicative of one or more transmission bands and one or more reception bands. In some implementations, the band select signal indicates a single cellular frequency band as the transmission band and the reception band, which may be referred to as single-band communication.

In some implementations, the band select signal indicates multiple cellular frequency bands as transmission bands (referred to as uplink carrier aggregation communication) and/or multiple cellular frequency bands as reception bands (referred to as downlink carrier aggregation communication).

In some implementations, the band select signal indicates a single cellular frequency band as a transmission band and multiple cellular frequency bands as reception bands, e.g., uplink single-band communication and downlink carrier aggregation communication. For example, the band select signal may indicate a first cellular frequency band as the transmission band and both the first cellular frequency band and a second cellular frequency band as reception bands.

Thus, the transmitter system 132 may transmit, via the first output, a signal at the first cellular frequency band and the receiver system 134 may receive, via the first input terminal and second input terminal, signals at the first cellular frequency band and the second cellular frequency band, respectively.

In some implementations, the transmitter system 132 may also unintentionally transmit, via the second output, a signal at the second cellular frequency band. For example, harmonic coupling within the transmitter system 132 may result in transmission at the second cellular frequency band of a higher-frequency copy of the signal transmitted at the first cellular frequency band. Other circumstances may lead to unintentional transmission of a signal via the second output at the second cellular frequency band, such as spurious signal and intermodulation products. This unintended signal, transmitted by the transmitter system 132 via the second output terminal, may propagate through the multiplexing system 101 and be received at the second input terminal of the receiver system 134, appearing as noise and degrading the signal intended to be received by the receiver system 134 at the second input.

Thus, the wireless communication configuration 100 includes a switch 136 coupling the second output to a ground potential. When the switch is closed, the unintended signal is routed to the ground rather than the second input of the receiver system 134.

The switch 136 may be opened or closed based on the band select signal. When the band select signal indicates the second cellular frequency band as a transmission band, the switch 136 is open, allowing an intended signal from the second output of the transmitter system 132 to be propagated to the multiplexing system 101 and transmitted via one of the antennas 115, 125. When the band select signal indicates the second cellular frequency band as a reception band, but not a transmission band, the switch 136 is closed, routing any unintended signal from the second output of the transmitter system 132 to ground rather than to the multiplexing system 101 and, potentially, to the second input of the receiver system 134. When the band select signal does not indicate the second cellular frequency as a transmission band or a reception band, the switch 136 may be opened or closed.

Figure 2:
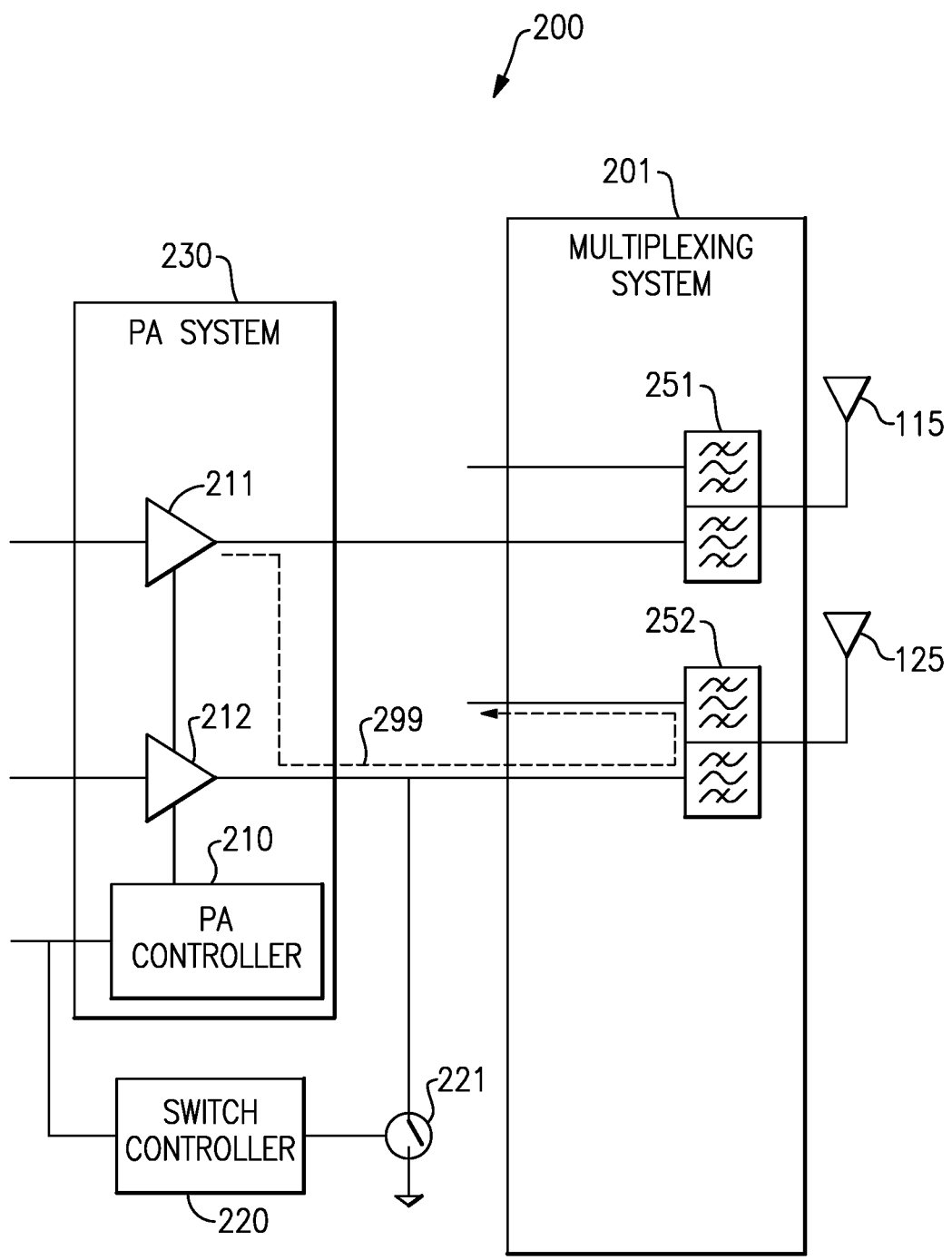
FIG. 2 illustrates an example wireless communication configuration that includes a switch and a switch controller.

FIG. 2 shows that, in some embodiments, a wireless communication configuration 200 includes a switch controller 220. The wireless communication configuration 200 further includes a power amplification system 230, a multiplexing system 201, a first antenna 115, and a second antenna 125. The power amplification system 230 (which may be implemented as part of a transmitter system such as the transmitter system 132 of FIG. 1) includes a first power amplifier 211 and a second power amplifier 212 controlled by a power amplifier controller 210. Each power amplifier 211, 212, when enabled by the power amplifier controller 210, is configured to provide, at an output of the power amplifier, an amplified version of a signal received at an input of the power amplifier. The power amplifier controller 210 is configured to selectively enable and/or disable the power amplifiers 211, 212 based on a received band select signal.

In some implementations, the first power amplifier 211 is configured to amplify a signal at a first cellular frequency band and the second power amplifier 212 is configured to amplify a signal at a second cellular frequency band. For example, the first cellular frequency band may be Universal Mobile Telecommunications System (UMTS) Band 17, between 704 megahertz (MHz) and 746 MHz, and the second cellular frequency band may be UMTS Band 4, between 1710 MHz and 2155 MHz. Each cellular frequency band may include an uplink frequency sub-band and a downlink frequency sub-band. For example, the first cellular frequency band may include an uplink frequency sub-band between 704 MHz and 716 MHz and a downlink frequency sub-band between 734 MHz and 746 MHz. Similarly, the second cellular frequency band may include an uplink frequency sub-band between 1710 MHz and 1755 MHz and a downlink frequency sub-band between 2110 MHz and 2155 MHz. Other cellular frequency bands may be used, such as those described below in Table 1 or other non-UMTS cellular frequency bands.

As a first example, the band select signal may indicate the first cellular frequency band as a transmission band and both the first cellular frequency band and the second cellular frequency band as reception bands. Thus, a first reception signal at the first cellular frequency band is received at the first antenna 115 and routed by the multiplexing system 201 to a first input of a receiving system (not shown). Also, a second reception signal at the second cellular frequency band is received at the second antenna 125 and routed by the multiplexing system 201 to a second input of the receiving system.

At the same time, in response to the band select signal, the power amplifier controller 210 enables the first power amplifier 211 and disables the second power amplifier 212. A transmission signal at the first cellular frequency band is received at a first input of the power amplification system 230 (coupled to the input of the first power amplifier 211) and an amplified version of the transmission signal is transmitted via a first output of the power amplification system 230 (coupled to the output of the first power amplifier 211). The amplified version of the transmission signal is routed by the multiplexing system 201 to the first antenna 115 and transmitted. The multiplexing system 201 can route the signals as described above using a first duplexer 251 and a second duplexer 252.

As described above, an unintended signal at the second cellular frequency band may be transmitted via a second output of the power amplification system 230 (coupled to the output of the second power amplifier 212). In some implementations, the first power amplifier 211 may not be perfectly linear and may output, in addition to an amplified version of the transmission signal, harmonic copies of the transmission signal at multiples of the first cellular frequency band. The output of the first power amplifier 211 (including the harmonic copies) may, following path 299, couple with other components of the power amplification system 230 and leak out the second output of the power amplification system 230. The leaked signal, further following path 299, may propagate to the multiplexing system 201 and leak through the second duplexer 252 to the second input of the receiving system (not shown). Thus, a harmonic copy of the transmission signal at the first cellular frequency band may lie within the second cellular frequency band (or the downlink sub-band thereof) and may be received as noise at the second input of the receiving system.

Thus, the wireless communication configuration 200 includes a switch 221 coupling the second output of the power amplification system 230 to a ground potential. The switch 221 is controlled by a switch controller 220 that opens or closes the switch 221 based on the band select signal. When the band select signal indicates the second cellular frequency band as a reception band, but not a transmission band, the switch controller 220 closes the switch 221, routing any unintended signal from the second output of the power amplification system 230 to ground rather than the second input of the receiver system.

As a second example, the band select signal may indicate the second cellular frequency band as a transmission band and the second cellular frequency band as a reception band. Thus, a reception signal at the second cellular frequency band is received at the second antenna 125 and routed by the multiplexing system 201 to the second input of the receiving system.

At the same time, in response to the band select signal, the PA controller 210 disables the first power amplifier 211 and enables the second power amplifier 212. A transmission signal at the second cellular frequency band is received at a second input of the power amplification system 230 (coupled to the input of the second power amplifier 212) and an amplified version of the transmission signal is transmitted via the second output of the power amplification system 230 (coupled to the output of the second power amplifier 212). The amplified version of the transmission signal is routed by the multiplexing system 201 to the second antenna 125 and transmitted.

If the switch 221 were closed, the amplified transmission signal would be routed to ground rather than the multiplexing system 201. Thus, when the band select signal indicates the second cellular frequency band as a transmission band, the switch controller 220 opens the switch 221.

In general, the switch controller 220 controls the switch 221 based on the band select signal. When the band select signal indicates the second cellular frequency band as a transmission band, the switch controller 220 opens the switch 221, allowing an intended signal from the second output of the power amplification system 230 to be propagated to the multiplexing system 201 and transmitted via the second antenna 125. When the band select signal indicates the second cellular frequency band as a reception band, but not a transmission band, the switch controller 220 closes the switch 221, routing any unintended signal from the second output of the power amplification system 230 to ground rather than to the multiplexing system 201 and, potentially, to the second input of the receiver system. When the band select signal does not indicate the second cellular frequency as a transmission band or a reception band, the switch controller 220 may open the switch or close the switch 221.

Figure 3:
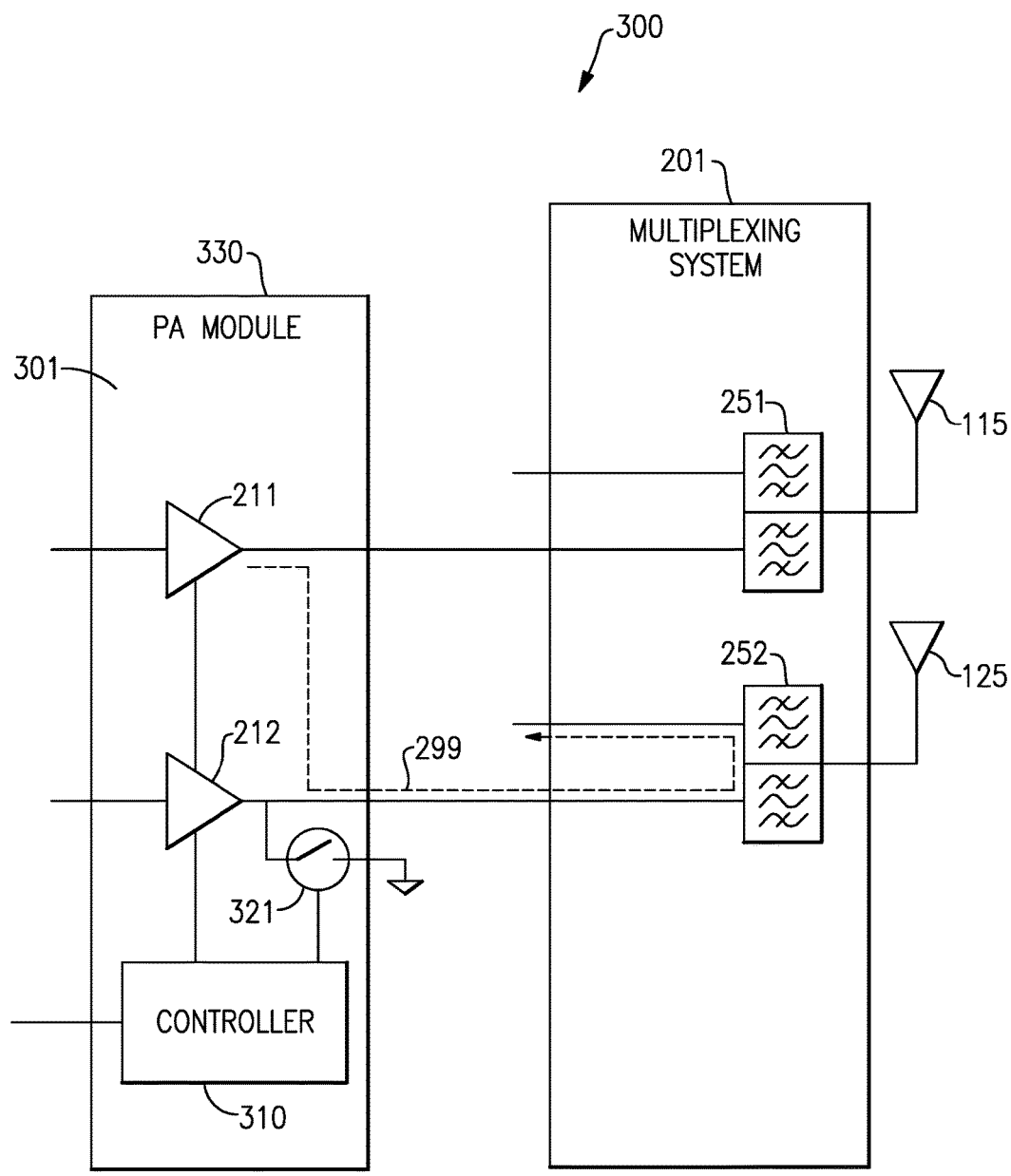
FIG. 3 illustrates an example wireless communication configuration that includes a power amplification module implemented on a packaging substrate, the module including a switch controlled by a controller to reduce harmonic leakage.

FIG. 3 shows that, in some embodiments, a wireless communication configuration 300 includes a power amplification module 330 with a switch 321 to reduce harmonic leakage. The wireless communication configuration 300 further includes the multiplexing system 201 and antennas 115, 125 as described above with respect to FIG. 2.

The power amplification module 330 (which may be implemented as part of a transmitter system such as the transmitter system 132 of FIG. 1) includes a packaging substrate 301 configured to receive a plurality of components and a power amplification system implemented on the packaging substrate 301. The power amplification system includes a first amplifier 211 and a second amplifier 212 implemented on the packaging substrate 301. In some implementations, the first amplifier 211 and the second amplifier 212 are implemented on the packaging substrate 301 with separate chips. Further, in some implementations, the separate chips do not share a common die attach ground pad within the power amplification module 330, e.g., the separate chips are coupled to separate die attach ground pads of the power amplification module 330. In some implementations, the output terminals of the power amplification module 330 respectively coupled to the outputs of the first amplifier 211 and the second amplifier 212 are spatially separated, e.g., the output terminals are separated by other outputs, are disposed on opposite sides of the module, or are otherwise separated. In some implementations, the output terminals have maximal spatial separation.

The power amplification system further includes a switch 321 implemented on the packaging substrate 301. The switch 321 is coupled between the output of the second amplifier 212 and a ground terminal of the power amplification module 330 that is in turn coupled to a ground potential.

The power amplification system further includes a controller 310 implemented on the packaging substrate 310. The controller 310 is configured to receive a band select signal and selectively enable and/or disable the appropriate power amplifiers 211, 212 based on the band select signal. The controller 310 is further configured to control the switch 321 based on the band select signal. For example, in some implementations, the controller 310 is configured to open the switch 321 in response to the band select signal indicating a second cellular frequency band as a transmission band and close the switch 321 in response to the band select signal indicating the second cellular frequency band as a reception band, but not a transmission band.

Although the switch 321 is illustrated in FIG. 3 (and elsewhere herein) as a shunt switch, coupling the output of the second amplifier 212 to a ground potential in a closed position, it is to be appreciated that the switch 321 could alternatively (or additionally) be implemented as a series switch, decoupling the output of the second amplifier 212 from the corresponding output terminal of the power amplification module in an open position. Thus, each of the switches described herein as shunt switches may be replaced (or supplemented) with a series switch at the same location and opposite open/close configuration.

Figure 4:
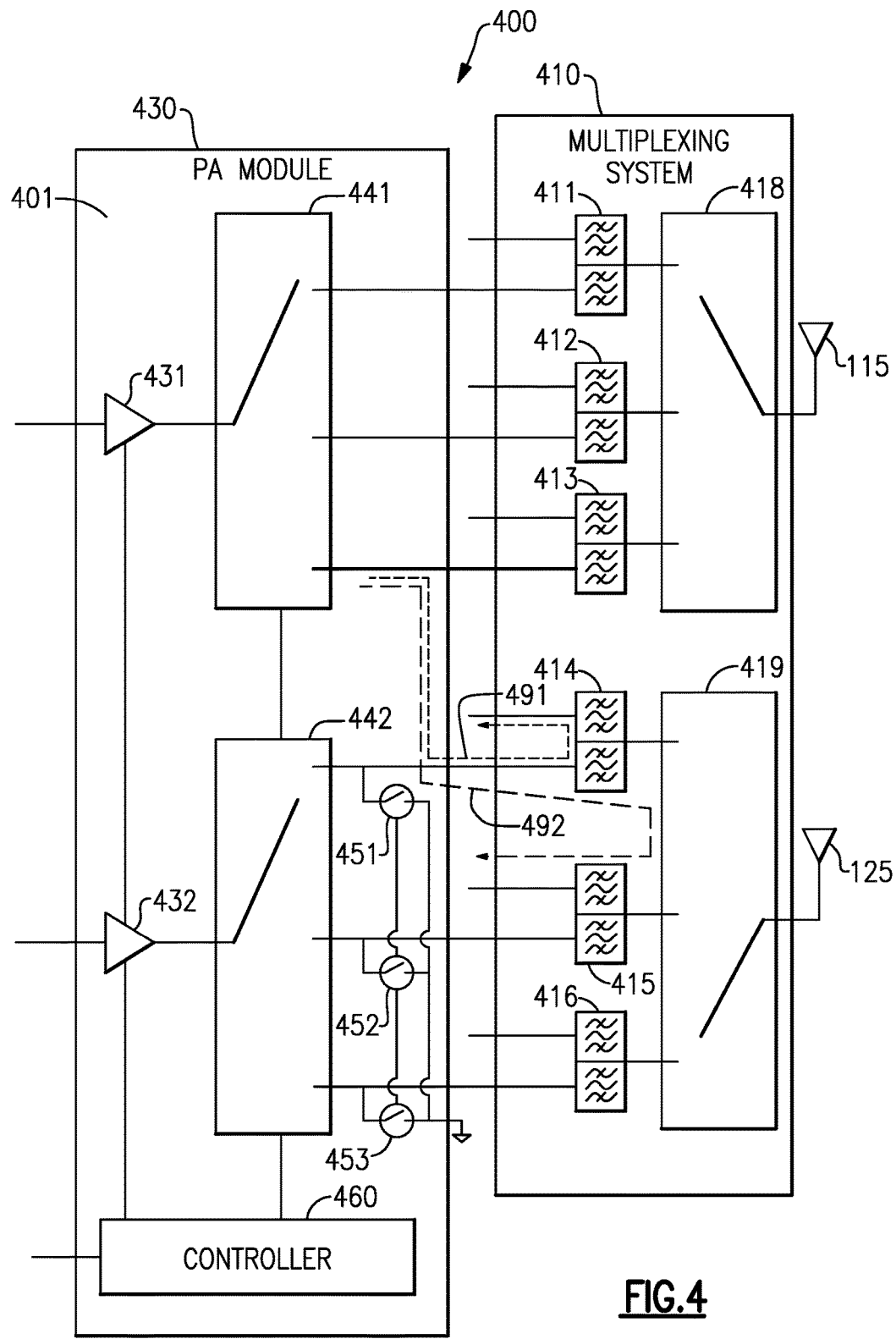
FIG. 4 illustrates an example wireless communication configuration that includes a power amplification module supporting multiple sets of cellular frequency bands.

FIG. 4 shows that in some embodiments, a wireless communication configuration 400 includes a power amplification module 430 supporting multiple sets of cellular frequency bands. The wireless communication configuration 400 further includes a multiplexing system 410, a first antenna 115, and a second antenna 125.

The power amplification module 430 (which may be implemented as part of a transmitter system such as the transmitter system 132 of FIG. 1) includes a packaging substrate 401 configured to receive a plurality of components and a power amplification system implemented on the packaging substrate 401. The power amplification system includes a first power amplifier 431 and a second power amplifier 432 controlled by a controller 460. Each power amplifier 431, 432, when enabled by the controller 460, is configured to provide, at an output of the power amplifier, an amplified version of a signal received at an input of the power amplifier. The controller 460 selectively enables and/or disables the power amplifiers 431, 432 based on a received band select signal.

In some implementations, the first power amplifier 431 is configured to amplify a signal at any of a first set of cellular frequency bands, such as a set of lower cellular frequency bands (e.g., cellular frequency bands below approximately 1000 MHz) and the second power amplifier 432 is configured to amplify a signal at any of a second set of cellular frequency bands, such as a set of higher cellular frequency bands (e.g., cellular frequency bands above approximately 1400 MHz). As an example, the first set of cellular frequency bands can include one or more of UMTS Bands 5, 8, and 12 (or 17, which is a subset of 12) and the second set of cellular frequency bands can include one or more of UMTS Bands 1, 2, and 4.

The power amplification system includes a first band select switch 441 coupled to the output of the first power amplifier 431 and a second band select switch 442 coupled to the output of the second power amplifier 432. Each of the band select switches 441, 442 may be implemented as a single-pole/multiple-throw (SPMT) switch that routes a received signal to one of a plurality of outputs corresponding to one of the set of cellular frequency bands based on a signal from the controller 460 that is, in turn, based on the band select signal. Thus, the controller 460 controls each of the band select switches 441, 442 based on the band select signal.

As a first example, the controller 460 may receive a band select signal indicating a first one of the first set of cellular frequency bands (e.g., UMTS Band 5) as the sole transmission band. In response, the controller 460 can enable the first power amplifier 431, disable the second power amplifier 432, and place the first band select switch 441 in a first position. As a second example, the controller 460 may receive a band select signal indicating a second one of the first set of cellular frequency bands (e.g., UMTS Band 8) and a first one of the second set of cellular frequency bands (e.g., UMTS Band 1) are transmissions bands. In response, the controller 460 can enable the first power amplifier 431, enable the second power amplifier 432, place the first band select switch 441 in a second position, and place the second band select switch 442 in a first position.

The multiplexing system 410 similarly includes a first band select switch 418 and a second band select switch 419 for routing the outputs of the power amplification module 430 to the antennas 115, 125. The band select switches 418, 419 may be controlled by the controller 460 or another controller based on the band select signal. The multiplexing system 410 also includes a number of duplexers 411-416 for routing signals from the antennas 115, 125 to a receiving system (not shown).

One or more unintended signals at one or more of the second set of cellular frequency bands may be transmitted via the output terminals of the power amplification module 430 that are coupled to the second band select switch 442. In some implementations, the first power amplifier 431, due at least in part to non-linearity of the amplifier, may output harmonic copies of a transmission signal at multiples of a cellular frequency band of the transmission signal in addition to an amplified version of the transmission signal. The output of the first power amplifier 431 may couple these harmonic copies to other components of the power amplification module 430, generating leaked signals at one or more of the output terminals of the power amplification module 430 that are coupled to the second band select switch 442. These leaked signal(s) may propagate to the multiplexing system 410 and leak through one of the duplexers 414-416 coupled to the second band select switch 419 of the multiplexing system 410 to a corresponding input of the receiving system (e.g., as shown in path 491). Alternatively or additionally, the leaked signal(s) may propagate to the multiplexing system 410 and leak through the second band select switch 419 of the multiplexing system 410 to a corresponding input of the receiving system (e.g., as shown in path 492). Thus, a harmonic copy of the transmission signal at one of the first set of cellular frequency bands may lie within one of the second sets of cellular frequency bands (or the downlink sub-band thereof) and be received as noise at the corresponding input of the receiving system.

Thus, the power amplification system includes a set of switches 451-453 respectively coupling a set of outputs of the second band select switch 442 to a ground terminal of the power amplification module 430 that is in turn coupled to a ground potential. The switches 451-453 are controlled by the controller 460 based on the band select signal.

The controller 460 may control the switches 451-453 using any of a number of heuristics. In some implementations, the controller 460 controls the switches 451-453 based on a lookup table that associates sets of cellular frequency bands (as indicated by the band select signal) with switch parameters indicating which of the switches 451-453 are open and which are closed.

When the band select signal indicates a particular one of the second set of cellular frequency bands as a transmission band, the controller 460 opens the corresponding switch. In some implementations, the controller 460 closes all of the other switches. In some implementations, the controller 460 opens all of the switches 451-453 in response to the band select signal indicating any one of the second set of cellular frequency bands as a transmission band.

In some implementations, when the band select signal indicates a particular one of the second set of cellular frequency bands as a reception band, but not a transmission band, the controller 460 closes the corresponding switch. In some implementations, the controller 460 closes the corresponding switch only when the band select signal also indicates, as a transmission band, a particular one of the first set of cellular frequency bands with a harmonic that lies within (or sufficiently close to) the particular one of the second set of cellular frequency bands (or the downlink sub-band thereof).

Figure 5:
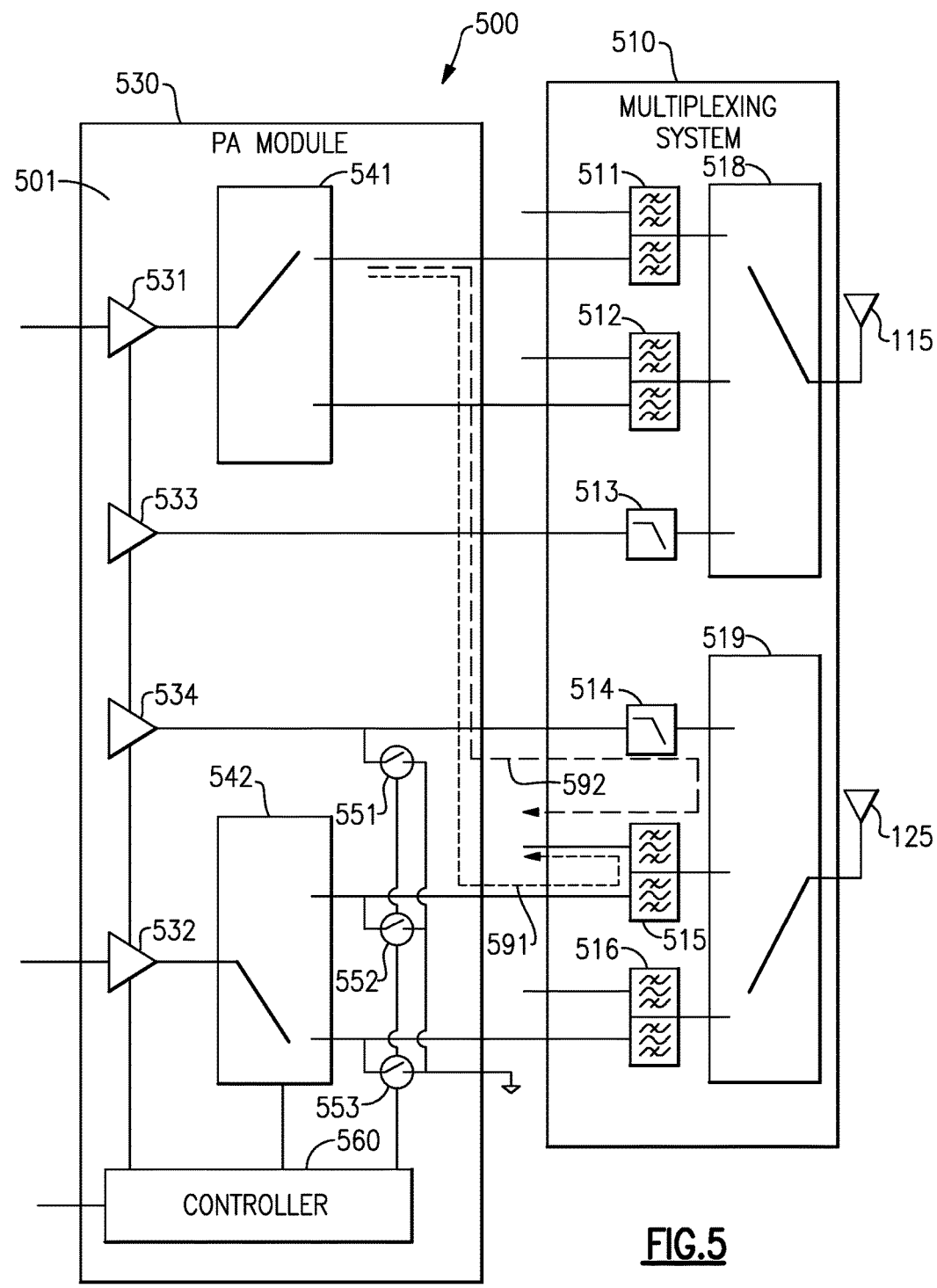
FIG. 5 illustrates an example wireless communication configuration that includes a multi-mode power amplification module supporting multiple cellular protocols.

FIG. 5 shows that in some embodiments, a wireless communication configuration 500 includes a multi-mode power amplification module 530 supporting multiple cellular protocols. The wireless communication configuration 500 further includes a multiplexing system 510, a first antenna 115, and a second antenna 125.

The power amplification module 530 (which may be implemented as part of a transmitter system such as the transmitter system 132 of FIG. 1) includes a packaging substrate 501 configured to receive a plurality of components and a power amplification system implemented on the packaging substrate 501. The power amplification system includes a first power amplifier 531, a second power amplifier 532, a third power amplifier 533, and a fourth power amplifier 534 controlled by a controller 560. Each power amplifier 531-534, when enabled by the controller 560, is configured to provide, at an output of the power amplifier, an amplified version of a signal received at an input of the power amplifier. The controller 560 enables or disables the power amplifiers 531-534 based on a received band select signal.

In some implementations, the first power amplifier 531 is configured to amplify a signal at any of a first set of cellular frequency bands for a first cellular protocol, such as a set of lower cellular frequency bands (e.g., cellular frequency bands below approximately 1000 MHz) for 3G/4G or UMTS communication and the second power amplifier 532 is configured to amplify a signal at any of a second set of cellular frequency bands for the first cellular protocol, such as a set of higher cellular frequency bands (e.g., cellular frequency bands above approximately 1400 MHz) for 3G/4G or UMTS communication. As an example, the first set of cellular frequency bands can include one or more of UMTS Bands 5, 8, and 12 (or 17, which is a subset of 12) and the second set of cellular frequency bands can include one or more of UMTS Bands 1, 2, and 4.

In some implementations, the third power amplifier 533 is configured to amplify a signal at a third cellular frequency band for a second cellular protocol, such as a lower frequency band for 2G or GSM (Global System for Mobile Communications) communication and the fourth power amplifier 534 is configured to amplify a signal at a fourth cellular frequency band for the second cellular protocol, such as a higher frequency band for 2G or GSM communications. As an example, the third cellular frequency band can include GSM-850 and the fourth cellular frequency band can include GSM-1900. In some implementations, the third cellular frequency band may coincide with one of the first set of cellular frequency bands and/or the fourth cellular frequency band may coincide with one of the second set of cellular frequency bands.

The power amplification system includes a first band select switch 541 coupled to the output of the first power amplifier 531 and a second band select switch 542 coupled to the output of the second power amplifier 532. Each of the band select switches 541, 542 may be implemented as a single-pole/multiple-throw (SPMT) switch that routes a received signal to one of a plurality of output terminals of the power amplification module 530 corresponding to one of the set of cellular frequency bands based on a signal from the controller 560 that is, in turn, based on the band select signal. The outputs of the third power amplifier 533 and the fourth power amplifier 534 are respectively coupled to output terminals of the power amplification module 530 corresponding to the third cellular frequency band and fourth cellular frequency band without passing through a band select switch. In some implementations, the outputs of the third power amplifier 533 and the fourth power amplifier 534 are respectively coupled to the output terminals of the power amplification module 530 corresponding to the third cellular frequency band and fourth cellular frequency band through respective bandpass filters.

The multiplexing system 510 similarly includes a first band select switch 518 and a second band select switch 519 for routing the outputs of the power amplification module 530 to the antennas 115, 125. The band select switches 518, 519 may be controlled by the controller 560 or another controller based on the band select signal. The multiplexing system 510 includes a number of duplexers 511, 512, 515, 516 for routing signals from the antennas 115, 125 to a receiving system (not shown). The multiplexing system 510 includes a low-pass filter 513 disposed between the first band select switch 518 and the input corresponding to the third cellular frequency band (coupled to the third power amplifier 533) and includes a low-pass filter 514 disposed between the second band select switch 519 and the input corresponding to the fourth cellular frequency band (coupled to the fourth power amplifier 534).

One or more unintended signals at one or more of the second set of cellular frequency bands may be transmitted via the output terminals of the power amplification module 530 that are coupled to the second band select switch 542 or the output terminal of the power amplification module 530 that is coupled to the fourth power amplifier 534. In some implementations, due at least in part to non-linearity of the amplifier, the first power amplifier 531 may output harmonic copies of a transmission signal at multiples of a cellular band of the transmission signal in addition to an amplified version of the transmission signal. The output of the first power amplifier 531 (including the harmonic copies) may couple with other components of the power amplification module 530 and leak out one or more of the output terminals of the power amplification module 530 that are coupled to the second band select switch 542 or the output terminal of the power amplification module 530 that is coupled to the fourth power amplifier 534.

The leaked signal(s) from one or more of the output terminals of the power amplification module 530 that are coupled to the second band select switch 542 may propagate to the multiplexing system 510 and leak through one of the duplexers 515, 516 coupled to the second band select switch 519 of the multiplexing system 510 to a corresponding input of the receiving system (e.g., as shown in path 591). The leaked signal from the output terminal of the power amplification module 530 that is coupled to the fourth power amplifier 534 may propagate to the multiplexing system 510 and leak through the second band select switch 519 of the multiplexing system 510 to the corresponding input of the receiving system (e.g., as shown in path 592). Thus, a harmonic copy of the transmission signal at one of the first set of cellular frequency bands may lie within one of the second set of cellular frequency bands (or the downlink sub-band thereof) and be received as noise at the corresponding input of the receiving system.

Thus, the power amplification system includes a set of switches 551-553 configured to selectively couple the output of the fourth power amplifier 534 and the outputs of the second band select switch 542 to a ground terminal of the power amplification module 530 that is in turn coupled to a ground potential. The switches 551-553 are controlled by the controller 560 based on the band select signal as described above.

Figure 6:
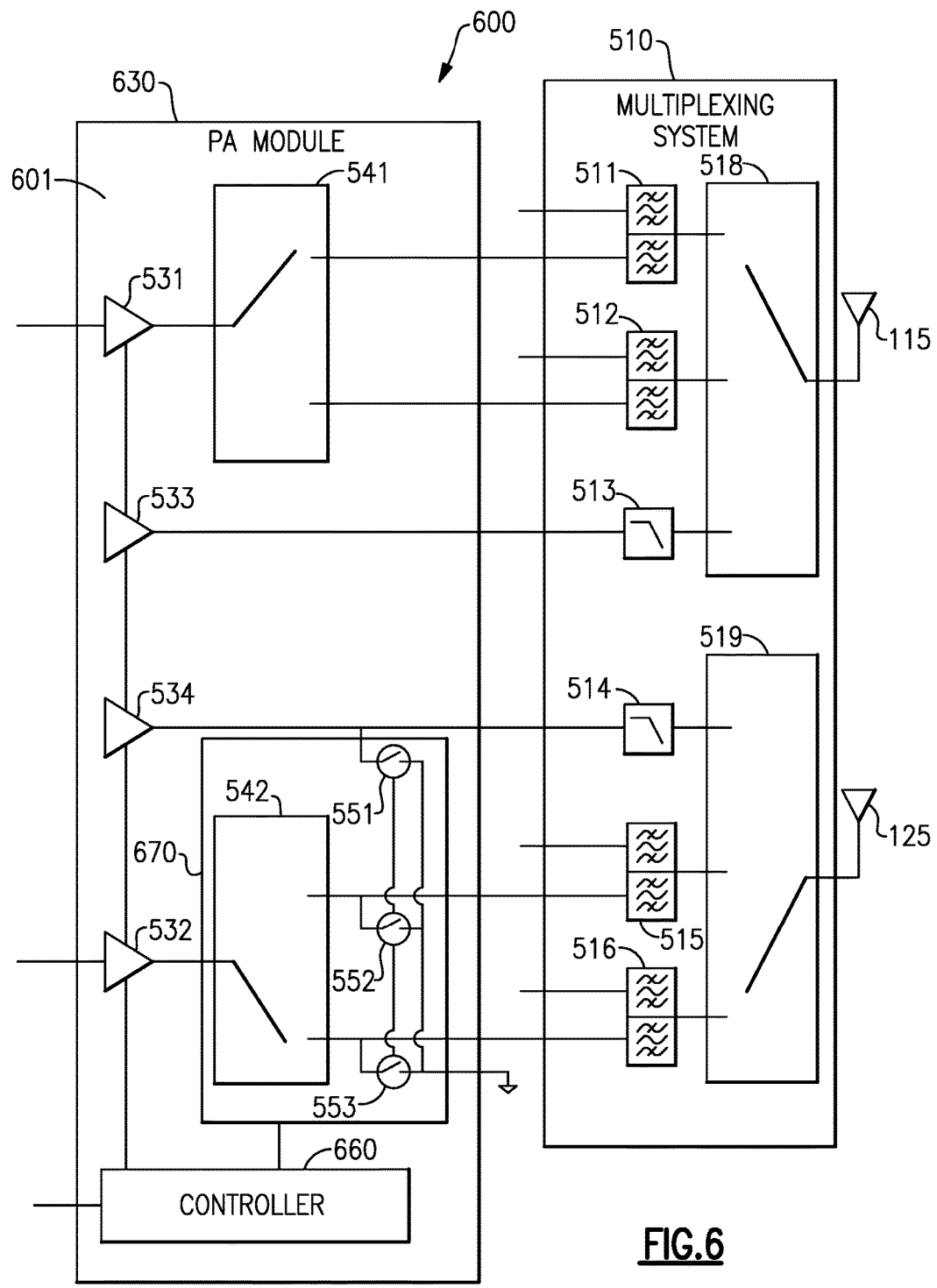
FIG. 6 illustrates an example wireless communication configuration that includes a multi-mode power amplification module having a switching module to reduce harmonic leakage.

FIG. 6 shows that in some embodiments, a wireless communication configuration 600 includes power amplification module 630 having a switching module 670 including a band select switch 542 and one or more harmonic leakage reduction switches 551-553. The wireless communication configuration 600 further includes a multiplexing system 510, a first antenna 115, and a second antenna 125 as described above with respect to FIG. 5.

The power amplification module 630 (which may be implemented as part of a transmitter system such as the transmitter system 132 of FIG. 1) includes a packaging substrate 601 configured to receive a plurality of components and a power amplification system implemented on the packaging substrate 601. The power amplification system a first power amplifier 531, a second power amplifier 532, a third power amplifier 533, and a fourth power amplifier 534 as described above with respect to FIG. 5. The controller 660 enables or disables the power amplifiers 531-534 based on a received band select signal.

The power amplification system includes a first band select switch 541 coupled to the output of the first power amplifier 531 and a second band select switch 542 coupled to the output of the second power amplifier 532 as described above with respect to FIG. 5. Similarly, the power amplification system includes a set of switches 551-553 respectively coupling the output of the fourth power amplifier 534 and the outputs of the second band select switch 542 to a ground terminal of the power amplification module 630 that is coupled to a ground potential.

The second band select switch 542 and the switches 551-553 are integrated into a switching module 670. The switching module 670 may, for example, be a single chip or die and may include a plurality of transistors arranged to perform the switching functions of the switching module 670.

The switching module 670 has a data input terminal coupled to the second power amplifier 532, a shunt input terminal coupled to the output of the fourth power amplifier 534, and a control input terminal coupled to the controller 660. In some implementations, the control input terminal includes multiple control terminals. Based on a signal received from the controller 660 (that is, in turn, based on the band select signal) via the control input terminal, the switching module 670 switches the second band select switch 542 and the harmonic leakage reduction switches 551-553, potentially coupling the data input terminal to one of a plurality of data output terminals and/or a ground terminal and potentially coupling the shunt input terminal to the ground terminal.

As shown in FIG. 6, a first switch 551 is coupled between the shunt input terminal of the switching module 670 and the ground terminal of the switching module 670. A second switch 552 and third switch 553 are coupled between respective outputs of the band select switch 542 and the ground terminal of the switching module 670.

Figure 7:
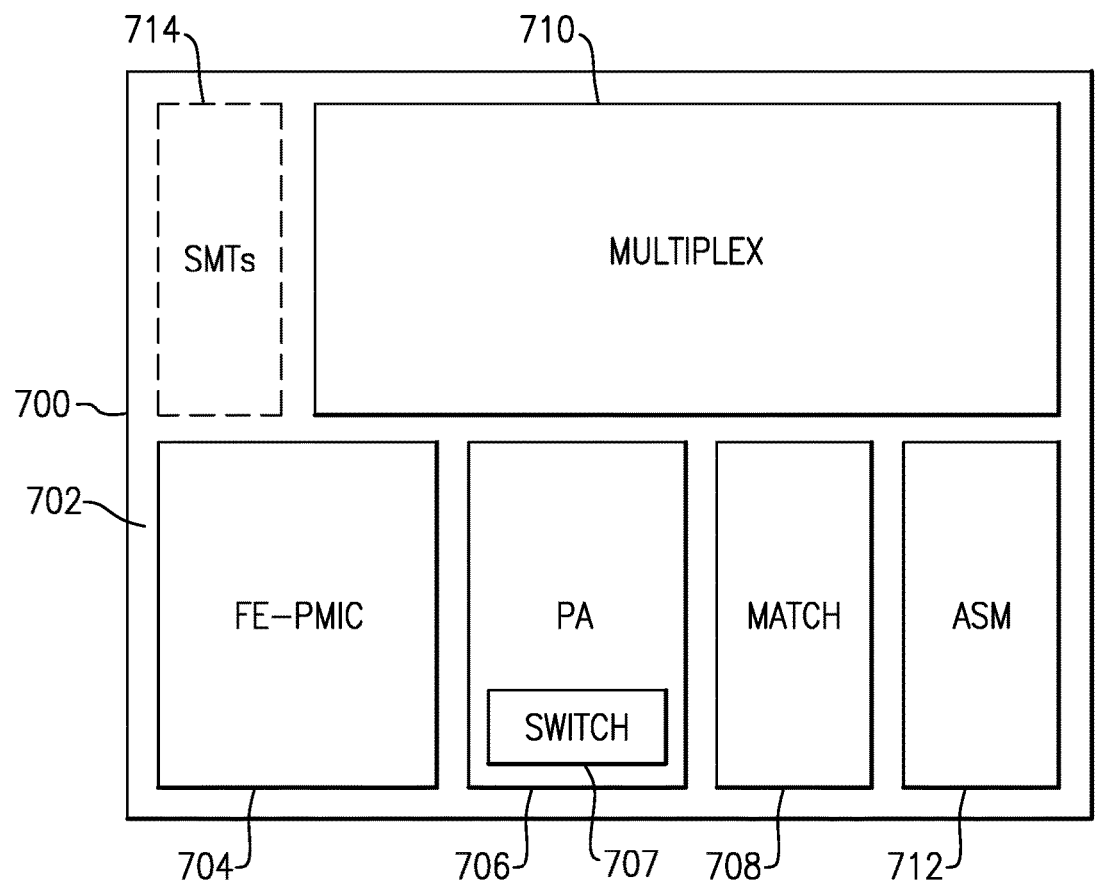
FIG. 7 illustrates that wireless communication configurations having one or more features as described herein can be implemented, wholly or partially, in a module.

FIG. 7 shows that in some embodiments, wireless communication configurations (e.g., some or all of those shown in FIGS. 1-6) can be implemented, wholly or partially, in a module. Such a module can be, for example, a front-end module (FEM). In the example of FIG. 7, a module 700 can include a packaging substrate 702, and a number of components can be mounted on such a packaging substrate 702. For example, an FE-PMIC component 704, a power amplifier assembly 706, a match component 708, and a multiplexer assembly 710 can be mounted and/or implemented on and/or within the packaging substrate 702. The power amplifier assembly 706 may include one or more harmonic leakage reduction switches 707 that couple the output of unused transmission band paths to ground. Other components such as a number of SMT devices 714 and an antenna switch module (ASM) 712 can also be mounted on the packaging substrate 702. Although all of the various components are depicted as being laid out on the packaging substrate 702, it will be understood that some component(s) can be implemented over other component(s).

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 8:
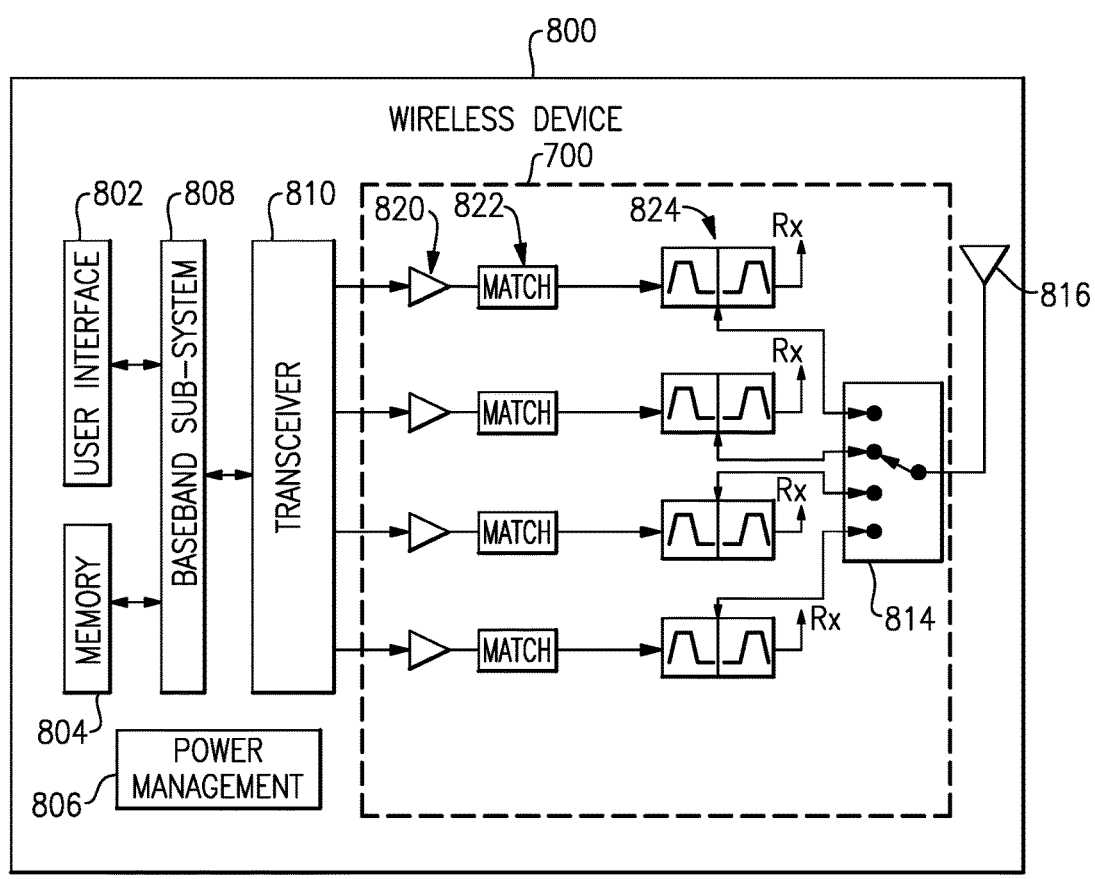
FIG. 8 illustrates an example wireless device having one or more advantageous features described herein.

FIG. 8 depicts an example wireless device 800 having one or more advantageous features described herein. In the context of a module having one or more features as described herein, such a module can be generally depicted by a dashed box 700, and can be implemented as, for example, a front-end module (FEM).

Referring to FIG. 8, power amplifiers (PAs) 820 can receive their respective signals from a transceiver 810 that can be configured and operated in known manners to generate signals to be amplified and transmitted, and to process received signals. The transceiver 810 is shown to interact with a baseband sub-system 808 that is configured to provide conversion between data and/or voice signals suitable for a user and signals suitable for the transceiver 810. The transceiver 810 can also be in communication with a power management component 806 that is configured to manage power for the operation of the wireless device 800. Such power management can also control operations of the baseband sub-system 808 and the module 700.

The baseband sub-system 808 is shown to be connected to a user interface 802 to facilitate various input and output of voice and/or data provided to and received from the user. The baseband sub-system 808 can also be connected to a memory 804 that is configured to store data and/or instructions to facilitate the operation of the wireless device, and/or to provide storage of information for the user.

In the example wireless device 800, outputs of the PAs 820 are shown to be matched (via respective match circuits 822) and routed to their respective duplexers 824. Such amplified and filtered signals can be routed to an antenna 816 (or multiple antennas) through an antenna switch 814 for transmission. In some embodiments, the duplexers 824 can allow transmit and receive operations to be performed simultaneously using a common antenna (e.g., 816). In FIG. 8, received signals are shown to be routed to "Rx" paths (not shown) that can include, for example, a low-noise amplifier (LNA).

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

As described herein, one or more features of the present disclosure can provide a number of advantages when implemented in systems such as those involving the wireless device of FIG. 8. For example, the use of diplexers rather than duplexers may lower the signal path losses between the power amplifier and antenna, reducing cost, size, and heat generation and increasing battery life.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1. As used herein, RF signals can be used to refer to signals within any one of the frequency bands listed in Table 1.

TABLE 1

| Band | Mode | Tx Frequency Range (MHz) | Rx Frequency Range (MHz) |
| --- | --- | --- | --- |
| B1  | FDD | 1,920-1,980     | 2,110-2,170     |
| B2  | FDD | 1,850-1,910     | 1,930-1,990     |
| B3  | FDD | 1,710-1,785     | 1,805-1,880     |
| B4  | FDD | 1,710-1,755     | 2,110-2,155     |
| B5  | FDD | 824-849         | 869-894         |
| B6  | FDD | 830-840         | 875-885         |
| B7  | FDD | 2,500-2,570     | 2,620-2,690     |
| B8  | FDD | 880-915         | 925-960         |
| B9  | FDD | 1,749.9-1,784.9 | 1,844.9-1,879.9 |
| B10 | FDD | 1,710-1,770     | 2,110-2,170     |
| B11 | FDD | 1,427.9-1,447.9 | 1,475.9-1,495.9 |
| B12 | FDD | 699-716         | 729-746         |
| B13 | FDD | 777-787         | 746-756         |
| B14 | FDD | 788-798         | 758-768         |
| B15 | FDD | 1,900-1,920     | 2,600-2,620     |
| B16 | FDD | 2,010-2,025     | 2,585-2,600     |
| B17 | FDD | 704-716         | 734-746         |
| B18 | FDD | 815-830         | 860-875         |
| B19 | FDD | 830-845         | 875-890         |
| B20 | FDD | 832-862         | 791-821         |
| B21 | FDD | 1,447.9-1,462.9 | 1,495.9-1,510.9 |
| B22 | FDD | 3,410-3,490     | 3,510-3,590     |
| B23 | FDD | 2,000-2,020     | 2,180-2,200     |
| B24 | FDD | 1,626.5-1,660.5 | 1,525-1,559     |
| B25 | FDD | 1,850-1,915     | 1,930-1,995     |
| B26 | FDD | 814-849         | 859-894         |
| B27 | FDD | 807-824         | 852-869         |
| B28 | FDD | 703-748         | 758-803         |

TABLE 1-continued

| Band | Mode | Tx Frequency Range (MHz) | Rx Frequency Range (MHz) |
|---|---|---|---|
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |
| B45 | TDD | 1,447-1,467 | 1,447-1,467 |
| B46 | TDD | 5,150-5,925 | 5,150-5,925 |
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the present disclosure using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments is not intended to be exhaustive or to limit the invention to the precise form disclosed above. While specific embodiments and examples are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily being limited to the systems described above. The elements and acts of the various embodiments described above can be combined to provide further embodiments.

While some embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A transmitter system comprising:
   a power amplification system including a first power amplifier configured to amplify a signal within a first set of frequency bands and a second power amplifier configured to amplify a signal within a second set of frequency bands;
   a first band select switch having a plurality of output ports and an input port coupled to an output of the first power amplifier, the first band select switch configured to route a received signal from the output of the first power amplifier to one of the plurality of output ports corresponding to a frequency band of the first set of frequency bands;
   a second band select switch having a plurality of output ports and an input port coupled to an output of the second power amplifier, the second band select switch configured to route a received signal from the output of the second power amplifier to one of the plurality of output ports corresponding to a frequency band of the second set of frequency bands;
   a plurality of switches, individual switches being coupled between an output port of the second band select switch and a ground potential; and
   a controller configured to, based on a band select signal indicating a first frequency band within the first set of frequency bands as a first transmission band and a second frequency band within the second set of frequency bands as a reception band but not a transmission band and a third frequency band within the second set of frequency bands as a second transmission band, enable the first power amplifier and the second power amplifier, to close a first switch of the plurality of switches corresponding to a harmonic of the first transmission band, and to open a second switch of the plurality of switches corresponding to the second transmission band in response to the band select signal.

2. The transmitter system of claim 1 wherein the controller is configured to open a targeted switch of the plurality of switches in response to the band select signal indicating a third frequency band within the second set of frequency bands as a transmission band.

3. The transmitter system of claim 1 wherein the controller is configured to control the first band select switch or the second band select switch based on the band select signal.

4. The transmitter system of claim 3 wherein the plurality of switches and the second band select switch are integrated into a switching module.

5. The transmitter system of claim 4 wherein the switching module includes a single chip.

6. The transmitter system of claim 5 wherein individual switches of the plurality of switches are coupled between the output of the second band select switch and a ground terminal of the switching module.

7. The transmitter system of claim 5 wherein individual switches of the plurality of switches are coupled between a shunt input terminal of the switching module and a ground terminal of the switching module.

8. The transmitter system of claim 1 wherein the first set of cellular frequency bands includes Universal Mobile Telecommunications System (UMTS) Band 17 and the second set of cellular frequency bands includes UMTS Band 4.

9. The transmitter system of claim 1 wherein the first set of cellular frequency bands includes Universal Mobile Telecommunications System (UMTS) Band 17 and the second set of cellular frequency bands includes Global System for Mobile Communications (GSM) Band 1900.

10. The transmitter system of claim 1 further comprising a receiver system configured to amplify received signals within the first set of frequency bands and received signals within the second set of frequency bands.

11. The transmitter system of claim 10 wherein closing of the targeted switch by the controller reduces noise in the receiver system from coupling of the harmonic of the uplink sub-band of the transmission band into the receiver system.

12. A radio-frequency (RF) module comprising:
a packaging substrate configured to receive a plurality of components; and
a transmitter system implemented on the packaging substrate, the transmitter system including a power amplification system including a first power amplifier configured to amplify a signal within a first set of frequency bands and a second power amplifier configured to amplify a signal within a second set of frequency bands, a first band select switch having a plurality of output ports and an input port coupled to an output of the first power amplifier, the first band select switch configured to route a received signal from the output of the first power amplifier to one of the plurality of output ports corresponding to a frequency band of the first set of frequency bands, a second band select switch having a plurality of output ports and an input port coupled to an output of the second power amplifier, the second band select switch configured to route a received signal from the output of the second power amplifier to one of the plurality of output ports corresponding to a frequency band of the second set of frequency bands, a plurality of switches, individual switches being coupled between an output port of the second band select switch and a ground potential, and a controller configured to, based on a band select signal indicating a first frequency band within the first set of frequency bands as a first transmission band and a second frequency band within the second set of frequency bands as a reception band but not a transmission band and a third frequency band within the second set of frequency bands as a second transmission band, enable the first power amplifier and the second power amplifier, to close a first switch of the plurality of switches corresponding to a harmonic of the first transmission band, and to open a second switch of the plurality of switches corresponding to the second transmission band in response to the band select signal.

13. The RF module of claim 12 wherein the RF module is a front-end module (FEM).

14. The RF module of claim 12 wherein the first power amplifier and the second power amplifier are implemented with separate chips.

15. The RF module of claim 14 wherein the separate chips are coupled to separate die attach ground pads of the RF module.

16. The RF module of claim 12 wherein a first plurality of output terminals of the RF module coupled to outputs of the first band select switch and a second plurality of output terminals coupled to outputs of the second band select switch are spatially separated.

17. The RF module of claim 12 wherein the RF module further includes a receiver system configured to amplify received signals within the first set of frequency bands and received signals within the second set of frequency bands.

18. The RF module of claim 17 wherein closing of the targeted switch by the controller reduces noise in the receiver system from coupling of the harmonic of the uplink sub-band of the transmission band into the receiver system.

19. A wireless device comprising:
a transceiver configured to generate a radio-frequency (RF) signal;
a front-end module (FEM) in communication with the transceiver, the FEM including a packaging substrate configured to receive a plurality of components, the FEM further including a transmitter system implemented on the packaging substrate, the transmitter system including a power amplification system including a first power amplifier configured to amplify a signal within a first set of frequency bands and a second power amplifier configured to amplify a signal within a second set of frequency bands, a first band select switch having a plurality of output ports and an input port coupled to an output of the first power amplifier, the first band select switch configured to route a received signal from the output of the first power amplifier to one of the plurality of output ports corresponding to a frequency band of the first set of frequency bands, a second band select switch having a plurality of output ports and an input port coupled to an output of the second power amplifier, the second band select switch configured to route a received signal from the output of the second power amplifier to one of the plurality of output ports corresponding to a frequency band of the second set of frequency bands, a plurality of switches, individual switches being coupled between an output port of the second band select switch and a ground potential, and a controller configured to, based on a band select signal indicating a first frequency band within the first set of frequency bands as a first transmission band and a second frequency band within the second set of frequency bands as a reception band but not a transmission band and a third frequency band within the second set of frequency bands as a second transmission band, enable the first power amplifier and the second power amplifier, to close a first switch of the plurality of switches corresponding to a harmonic of the first transmission band, and to open a second switch of the plurality of switches corresponding to the second transmission band in response to the band select signal; and
an antenna in communication with the FEM, the antenna configured to transmit an amplified version of the signal received from the transmitter system.

20. the wireless device of claim 19 wherein the FEM further includes a receiver system configured to amplify received signals within the first set of frequency bands and received signals within the second set of frequency bands such that closing of the targeted switch by the controller reduces noise in the receiver system from coupling of the harmonic of the uplink sub-band of the transmission band into the receiver system.

* * * * *